United States Patent
Vogel et al.

(10) Patent No.: US 10,509,787 B2
(45) Date of Patent: Dec. 17, 2019

(54) INSTALLATION FOR MANAGING A DATABASE

(75) Inventors: Marc Vogel, Vaucresson (FR); Dan Vogel, Vaucresson (FR)

(73) Assignee: ENABLON, Courbevoie (FR)

( * ) Notice: Subject to any disclaimer, the term of this patent is extended or adjusted under 35 U.S.C. 154(b) by 491 days.

(21) Appl. No.: 12/677,674

(22) PCT Filed: Sep. 11, 2008

(86) PCT No.: PCT/FR2008/051627
§ 371 (c)(1),
(2), (4) Date: Jul. 15, 2010

(87) PCT Pub. No.: WO2009/044087
PCT Pub. Date: Apr. 9, 2009

(65) Prior Publication Data
US 2010/0287164 A1   Nov. 11, 2010

(30) Foreign Application Priority Data

Sep. 11, 2007   (FR) ...................................... 07 57498

(51) Int. Cl.
G06F 17/30      (2006.01)
G06F 16/2455    (2019.01)

(52) U.S. Cl.
CPC .............................. *G06F 16/24561* (2019.01)

(58) Field of Classification Search
None
See application file for complete search history.

(56) References Cited

U.S. PATENT DOCUMENTS

| | | | |
|---|---|---|---|
| 6,199,062 B1* | 3/2001 | Byrne et al. | |
| 6,480,857 B1* | 11/2002 | Chandler | G06F 17/30595 707/792 |
| 2004/0122646 A1 | 6/2004 | Colossi et al. | |
| 2004/0215626 A1* | 10/2004 | Colossi et al. | 707/100 |
| 2007/0203892 A1 | 8/2007 | Adams et al. | |
| 2007/0260582 A1* | 11/2007 | Liang | G06F 17/30392 |

FOREIGN PATENT DOCUMENTS

CA      2 395 244 A1    6/2001

* cited by examiner

*Primary Examiner* — Tuankhanh D Phan
(74) *Attorney, Agent, or Firm* — Young & Thompson

(57) ABSTRACT

An installation for managing a database, the database having a database filter to provide the data sought in response to a query defining the filter and at least one data hierarchy of at least three hierarchical levels. The installation includes an interrogator to provide at least one query defining a filter to select data sought by using the database filter. The installation includes a representation of a hierarchy table that includes, for each hierarchised datum, the data on which it is dependent, regardless of the number of hierarchical levels separating them, the data being contained in a separate record of the table which also contains the hierarchised datum. During an interrogation on the basis of a query pertaining to hierarchised data, the database filter provides a response to the query formulated on the basis of the hierarchy table without resorting to external interrogation tools.

7 Claims, 1 Drawing Sheet

INSTALLATION FOR MANAGING A DATABASE

Figure 1:
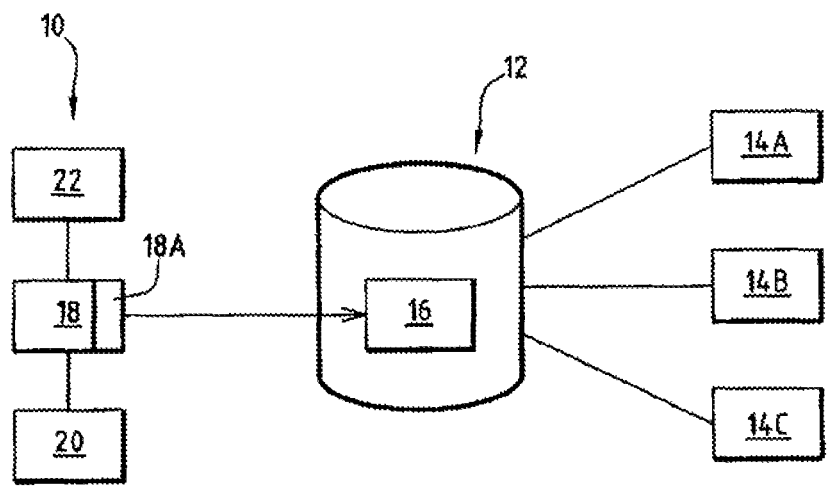

The present application is the U.S. National Phase of International Patent Application Serial No. PCT/FR2008/ 051627, filed on Sep. 11, 2008, which claims the priority to French Patent Application Serial No. 0757498, filed on Sep. 11, 2007, both of which are hereby incorporated by reference in their entireties.

The present invention relates to an interrogation installation for managing a database, having:

a/ a database comprising:

a1/ means for filtering the data contained in fields using internal algorithms for optimising the database which are capable of providing the data sought in response to a query defining the filter; and a2/ at least one data hierarchy of at least three hierarchical levels and b/ interrogation means capable of providing at least one query defining a filter permitting the selection of the data sought by using the filtering means.

Nowadays, databases are used to store a very large amount of data originating from many sources. It is known that these data are stored in tables each comprising several fields, these tables being defined by the data model. Relationships are established between the fields of the various tables and stored in the database.

Relational databases, unlike multidimensional databases, do not offer standard objects for representing hierarchies directly. A hierarchy or dimension, which are substantially equivalent terms in the world of multidimensional databases, enables dependencies of elements to be represented on several hierarchical levels. For example, in a hierarchy of the geographical type, the continents are on the first level, followed by the countries and then the cities. Thus, the city of Paris is on the third level, the second and first being France and Europe, respectively.

Such a hierarchy is commonly represented in the form of a tree, the son nodes of which are hierarchically at a lower level than the relation nodes on which they are dependent.

The value of introducing the concept of hierarchy in a database is to be able to effect changes of scale. For example, if the relational database contains a list of sales of a product per city throughout the entire world, it may be advantageous to filter, from that list, all of the sales associated with a particular region of the world, for example Europe.

In the prior art, several approaches are known for dealing with this subject of the management of hierarchies. They may be summarised as follows.

*Multidimensional Database Approach.

This first approach consists in representing the hierarchy as well as the list of sales in a multidimensional database. However, multidimensional databases are generally complex to use and they do not have some functionalities which exist only in the world of relational databases. This loss may become a great disadvantage because it involves a major structural choice having consequences in terms of functions, performance, and costs, if the need to manage structures at several levels is only limited and does not constitute the prime purpose of the product.

A variant of that approach consists in using OLAP (Online Analytical Processing) connectors which enable a relational database to be interrogated with multidimensional queries. The disadvantages are that OLAP connectors are not available for all relational database engines and that their performance is reduced owing to the fact that they have to pass via steps of reworking the data in order to effect multidimensional analyses.

*Relational Database Approach with the Data Model Typically Used.

The second approach consists in representing the hierarchy as well as the list of sales in a conventional relational database. However, a conventional relational database is used only for storage. All of the filtering work is carried out by a specialised algorithm through the computer program which processes those data. This algorithm is not used by the database engine. This approach has the disadvantage of retrieving all of the data or multiplying the number of queries to the database and therefore reducing performance. In the case of a list of sales in Europe, it is advisable to retrieve the data of all of the cities, even those outside Europe, in order subsequently to filter those which are sought, or to multiply the number of queries, as explained hereinafter.

The data model for the two tables is therefore, for example, the following:

Table representing the hierarchy

| Identifier of the node of the hierarchy | Description | Identifier of the Parent node according to the hierarchy |
| --- | --- | --- |
| 1 | Europe | 0 |
| 2 | France | 1 |
| 3 | Germany | 1 |
| 4 | Paris | 2 |
| 5 | Berlin | 3 |
| 6 | Lyons | 2 |
| 7 | North America | 0 |
| 8 | United States | 7 |
| 9 | Washington | 8 |
| 10 | New York | 8 |

Table representing sales

| Identifier of the node "City" in the hierarchy | Amount |
| --- | --- |
| 4 (Paris) | 3 |
| 5 (Berlin) | 7 |
| 6 (Lyons) | 4 |
| 9 (Washington) | 8 |
| 10 (New York) | 11 |

The structure of the table representing the hierarchy is the most compact structure that can be used to represent a hierarchy but it does not make it possible to reply, with the database alone, that is to say, using only an SQL query, to a simple question such as "what are the cities of Europe?".

Many processing operations have to be carried out directly in the application in order to compensate for the limitations of the database. For example, one approach for replying to the above question consists, by multiplying the queries in the database, in determining in advance all of the countries present in Europe and then subsequently determining all of the cities existing in France and in Germany (in this case Paris, Lyons, then Berlin). Then a first choice consists in executing several queries of the type ("what are the sales in Paris?", "what are the sales in Lyons?" and "what are the sales in Berlin?") in order to extract the sales associated with each city. On the other hand, the performance may become rapidly degraded if the number of cities is in the hundreds or thousands. Subsequently, the complexity of the source code will be impaired thereby, in particular by merging the results and/or optionally by reordering if it is desired to have sales by increasing amounts. In order to avoid multiplying the queries, it is also possible to construct a single query involving "IN" and "OR" operators used to filter all of the cities which have been identified beforehand. However, that has the following disadvantages:

some database engines have limits as regards the maximum number of characters authorised for SQL queries; SQL queries may increase rapidly here if the number of cities concerned exceeds the thousands.
   some database engines have limits as regards the number of "OR" operators authorised in a query. Moreover, multiplying the number of "OR" operators degrades performance.
   some database engines have limits as regards the number of elements that can be included in an "IN" clause. Moreover, multiplying the number of elements in an "IN" clause degrades performance.
   owing to the fact that the SQL query is generated dynamically, it becomes impossible to use SQL queries "having pre-compiled parameters" or "stored procedures" and therefore to benefit from the associated large gains in performance.

Another alternative consists in joining the table containing the hierarchy to itself and repeating those joining operations as many times as the datum sought is distanced from the top of the hierarchy. That alternative has the following disadvantages:

the number of joining operations which can be effected in the context of the same query is often limited by the database, which therefore limits the maximum number of levels of a hierarchy
   joining operations are complex and multiplying them in large numbers degrades performance
   writing the query may prove to be very complex (multiplication of the number of joining operations) and its processing may prove to be very awkward if, in the same query, the data sought have different hierarchical levels
   owing to the fact that the number of joining operations to be effected is not known in advance because it depends on the hierarchical level of the datum sought, nor is it possible here to use SQL queries having "pre-compiled parameters" or "stored procedures".

The object of the invention is therefore to permit a processing of hierarchised data in a relational database which does not require additional complex software tools and which can permit a rapid filtering of hierarchised data, and this with a single SQL query.

To that end, the invention relates to an installation of the above-mentioned type, characterised in that it comprises means for representing a hierarchy table comprising, for each hierarchised datum, all of the data on which it is dependent, regardless of the number of hierarchical levels separating them, each of the data on which it is dependent being contained in a separate record of the table which also contains the hierarchised datum; and in that, during an interrogation on the basis of a query pertaining to hierarchised data, the filtering means of the database are suitable for providing a response to the query formulated on the basis of the hierarchy table without resorting to tools for the multidimensional interrogation of the database that are external to the database.

The problem is thus solved in a high-performance manner by taking advantage of the mechanisms for optimising the database engine (indexes, hash tables, parallel searches, etc. . . . ).

The solution is thus provided by representing the hierarchy in a table of the conventional relational database in a format such that the database is itself capable of filtering the data using its own algorithms for internal optimisation and can do this on the basis of a simple SQL query.

According to particular embodiments, the installation comprises one or more of the following features:

the filtering means of the database comprise stored procedures and/or parameterised queries,
   the filtering means are capable of providing the data sought in response to a query executed in SQL language,
   the database is a relational database, at least one table of which contains relationships between the fields of the various tables,
   the filtering means comprise an indexer, e.g., means for indexing the hierarchy table,
   the filtering means of the database are suitable for providing a response to the query formulated on the basis of only the tables contained in the database and on the basis of the hierarchy table,
   the hierarchy table comprises, for each record, an indicator of the degree of relationship representing the distance between the hierarchical level of the hierarchised datum and the level of the hierarchised datum on which it is dependent,
   the hierarchy table comprises, for each hierarchised datum, a record, of which the indicator of the degree of relationship is zero and in which the hierarchised datum and the hierarchised datum on which it is dependent are identical,
   the hierarchy table comprises, for each record, an indicator of the level of hierarchical depth representing the distance between the hierarchical level of the hierarchised datum and the highest level of the hierarchised data on which it is dependent, and
      it comprises at least one table which describes at least some of the hierarchised data.

Figure 2:
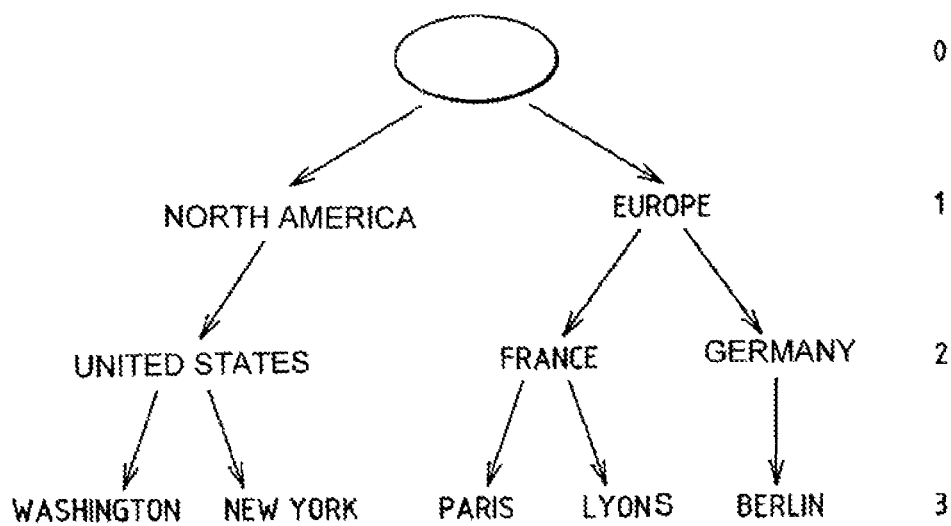

The invention will be better understood on reading the following description which is given purely by way of example and with reference to the drawings, in which:

FIG. 1 is a diagrammatic view of an installation for the management of a database according to the invention; and FIG. 2 is an illustration of a tree showing the organisation of an example of hierarchised data.

An installation 10 for managing a relational database comprising, in particular, hierarchised data is illustrated in FIG. 1. It has a relational database 12 comprising a set of tables 14A, 14B, 14C, for example numbering three, and an engine 16 for managing a database.

Each table comprises a set of fields. Some fields of the various tables are connected to each other by relationships.

The database management engine 16 comprises, as known per se, a filter, e.g., means for filtering the data contained in the fields of the tables on the basis of internal algorithms for optimising the relational database which are capable of providing the data sought in response to a query defining the filter. In the embodiment considered, the queries are SQL queries. The management engine 16 is formed, for example, by a server using suitable software, such as Microsoft Sql Server, Oracle, MySQL, etc.

The database management engine comprises stored procedures and/or parameterised queries, that is to say, already pre-compiled queries having parameters, of which only some parameters are modified. Those stored procedures and/or parameterised queries are capable of being executed rapidly, bearing in mind their nature.

The installation also comprises an interrogator, e.g., means 18 for interrogating the database which are formed by means 20 for inputting at least one query defining a filter permitting the selection of the data sought.

The interrogation means 18 are formed, for example, by a computer which uses suitable application software and which is connected to the server 16. The software is, for example, a sales management tool, entitlement and participation management software, software representing hierarchies of persons, products, etc. . . .

The interrogation means 18 comprise, in the application software, means 18A for generating a hierarchy table 14C having a specific structure which is explained hereinafter. The hierarchy table 14C describes in a particular and redundant format the hierarchies between the data. The software module constituting those interrogation means is capable of providing the hierarchy table using the hierarchised data to which the processing operations relate and of modifying that table each time the hierarchised data are modified.

The interrogation means 18 also comprise a software module for interrogating the database 12 on the basis of SQL queries used by the engine 16. This module is referred to as an SQL query maker. The module is capable of formulating queries in SQL format and of addressing them to the server 16 so that it extracts from the relational database 12 the desired data corresponding to the queries.

The input means 20 formed, for example, by a keyboard and a query editor permit the formulation of SQL queries in accordance with a predefined format.

Finally, the means 18 comprise a module 22 for making available data collected in response to the SQL queries formulated. This is, for example, a computer display screen or means for saving the extracted data.

The tables of the database comprise, for example, a table 14A of sales comprising two fields, namely an Identifier representing a place of sale, in particular a city, and an amount of sales associated with the place of sale.

This table 14A is, for example, in the following form:

| Table of Sales | |
|---|---|
| Identifier node City in the hierarchy | Amount |
| 4 (Paris) | 3 |
| 5 (Berlin) | 7 |
| 6 (Lyons) | 4 |
| 9 (Washington) | 8 |
| 10 (New York) | 11 |

In addition, another table 14B contains a description of the places of sale (identifier, description, address, inhabitants) without taking account of their position in the hierarchy of geographical entities.

Thus, this table 14B comprises, for example, four fields formed:

by a numerical identifier of each place of sale by a description comprising the name of the place of sale by an address of the shop of the place of sale, and by the number of inhabitants in the place of sale.

This table 14B is, for example, in the following form.

| Table of the Entities of the hierarchy | | | |
|---|---|---|---|
| Identifier | Description | Address Shop | Inhabitants |
| 1 | Europe | N/A | N/A |
| 2 | France | N/A | N/A |
| 3 | Germany | N/A | N/A |
| 4 | Paris | 3 rue des Champs Elysées | 5 000 000 |
| 5 | Berlin | 5 Wolfenstein Strasse | 6 000 000 |
| 6 | Lyons | 4 rue des Prés | 1 000 000 |
| 7 | North America | N/A | N/A |
| 8 | United States | N/A | N/A |
| 9 | Washington | 2001 Capitol Hill | 5 000 000 |
| 10 | New York | 42th Street | 8 000 000 |

Finally, another table 14 C represents a tree as described below:

The hierarchised data are represented in the form of a tree as illustrated in FIG. 2, in which each datum corresponds to a node of the tree. The data are thus each associated with a hierarchical level which defines the depth of a datum relative to the root of the tree. The level is indicated in the right-hand portion of the tree. The arrows are oriented in the direction of the hierarchical levels which, by convention, increase from the parent to the sons. A first datum of the tree is said to be dependent on a second datum if either that second datum is its father or if its father is dependent on that second datum. When two data are dependent, the number of hierarchical levels separating them represents the degree of relationship.

Each datum of this tree is translated in the hierarchy table 14C by several records, with one record for each dependency which exists with another datum of the tree.

In other words, the hierarchy table 14C contains for each node of the hierarchy what other nodes are its direct or indirect relations. To be more precise, for all of the hierarchised data, a record is contained in the table for each datum on which it is dependent. Each record contains the hierarchised datum and the datum on which it is dependent.

The hierarchy table 14C thus preferably contains four fields corresponding, respectively, to:

an identifier of the place of sale;

a degree of relationship, that is to say, the distance between the hierarchical level of the hierarchised datum and the level of the hierarchised datum on which it is dependent;

an identifier of the hierarchised datum on which the datum depends, optionally in order further to simplify some SQL queries and to offer even better performance; and a hierarchical depth level "depth" representing the distance between the hierarchical level of the hierarchised datum and the highest level of the hierarchised data on which it is dependent.

TABLE 14 C

| representing the hierarchy relationships (Nodes) | | | |
|---|---|---|---|
| Identifier of the place of sale | Degree of relationship | Identifier of the Parent according to the hierarchy | Depth |
| 1 (Europe) | 0 | 1 (Europe) | 1 |
| 1 (Europe) | 1 | 0 (Root) | 1 |
| 2 (France) | 0 | 2 (France) | 2 |
| 2 (France) | 1 | 1 (Europe) | 2 |
| 2 (France) | 2 | 0 (Root) | 2 |

TABLE 14 C-continued representing the hierarchy relationships (Nodes)

| Identifier of the place of sale | Degree of relationship | Identifier of the Parent according to the hierarchy | Depth |
|---|---|---|---|
| 3 (Germany) | 0 | 3 (Germany) | 2 |
| 3 (Germany) | 1 | 1 (Europe) | 2 |
| 3 (Germany) | 2 | 0 (Root) | 2 |
| 4 (Paris) | 0 | 4 (Paris) | 3 |
| 4 (Paris) | 1 | 2 (France) | 3 |
| 4 (Paris) | 2 | 1 (Europe) | 3 |
| 4 (Paris) | 3 | 0 (Root) | 3 |
| 5 (Berlin) | 0 | 5 (Berlin) | 3 |
| 5 (Berlin) | 1 | 3 (Germany) | 3 |
| 5 (Berlin) | 2 | 1 (Europe) | 3 |
| 5 (Berlin) | 3 | 0 (Root) | 3 |
| 6 (Lyons) | 0 | 6 (Lyons) | 3 |
| 6 (Lyons) | 1 | 2 (France) | 3 |
| 6 (Lyons) | 2 | 1 (Europe) | 3 |
| 6 (Lyons) | 3 | 0 (Root) | 3 |
| 7 (North America) | 0 | 7 (North America) | 1 |
| 7 (North America) | 1 | 0 (Root) | 1 |
| 8 (United States) | 0 | 8 (United States) | 2 |
| 8 (United States) | 1 | 7 (North America) | 2 |
| 8 (United States) | 2 | 0 (Root) | 2 |
| 9 (Washington) | 0 | 9 (Washington) | 3 |
| 9 (Washington) | 1 | 8 (United States) | 3 |
| 9 (Washington) | 2 | 7 (North America) | 3 |
| 9 (Washington) | 3 | 0 (Root) | 3 |
| 10 (New York) | 0 | 10 (New York) | 3 |
| 10 (New York) | 1 | 8 (United States) | 3 |
| 10 (New York) | 2 | 7 (North America) | 3 |
| 10 (New York) | 3 | 0 (Root) | 3 |

The degree of relationship corresponds to the distance in terms of generation between the elements of columns 1 and 3. The records with the degree of relationship 0 are such that columns 1 and 3 are identical. In this example, each node is thus coupled with up to three of its relation nodes.

Using a simple SQL query, it is possible to exploit the hierarchy between the data. A single SQL query is sufficient to exploit the hierarchy because it then resorts to the data engine 16 alone which comprises optimised algorithms capable of searching in the relational database (indexes, hash tables, parallel searches, etc. . . . ). In addition, as explained in the examples given hereinafter, the structure of the SQL query does not depend on the number of data to be extracted; it is also possible to draw from stored procedures or pre-compiled SQL queries in order to obtain additional gains in performance.

It might be feared that, in such a data model, the table of hierarchies would necessarily be large: the number of records being increased by the value n*d with n being the number of nodes and d being the maximum depth. However, this is not very restricting bearing in mind the gain observed and in as much as the factor which effects the increase is "d" and empirically in the case of the majority of hierarchies observed, it very rarely exceeds the value of 10 and the order of magnitude "n" (for example, number of countries) rarely exceeds the thousands. Thus a hierarchy of 1000 data and maximum depth 10 could never exceed 10000 records.

It is therefore possible simply to reply to the following questions using simple SQL queries.

what is the grandfather (Continent) of the city of Paris (Id=4)?
SELECT Relation FROM Nodes WHERE Degree=2 AND Identifier=4
This query returns: Europe
what are all the elements (Continent+Country+Cities) contained in Europe (Id=1)?
SELECT Identifier FROM Nodes WHERE Relation=1
This query returns: Europe, France, Germany, Paris, Berlin, Lyons
what are the cities contained in Europe (Id=1)?
SELECT Identifier FROM Nodes WHERE Relation=1 AND Degree=2
The portion "degree=2" enables the elements of the type Country to be removed and only the Cities to be kept.
This query returns: Paris, Lyons, Berlin
what is the list of sales made in Europe (Id=1)?
SELECT Sales.Identifier, Sales.Amount FROM Nodes, Sales
WHERE Sales.Identifier=Nodes.Identifier AND Nodes.Relation=1 AND Nodes.Degree=2
This query returns: 4 (=Paris), 3 and 6 (=Lyons), 4 and 5 (=Berlin), 7
what is the list of sales made in Europe (Id=1) and New York (Id=10)?
SELECT Sales.Identifier, Sales.Amount FROM Nodes, Sales WHERE Sales.Identifier=Nodes.Identifier AND Nodes.Relation IN (1,10) AND Nodes.Degree=2
This query illustrates that it is very readily possible, that is to say, without adding additional joins or complicating the query, to execute simultaneously interrogations on data located at different hierarchical levels (in this case Europe and New York)
what is the sum of the sales made in Europe (Id=1)?
SELECT SUM(Sales.Amount) FROM Nodes, Sales WHERE Sales.Identifier=Nodes.Identifier AND Nodes.Relation=1 AND Nodes.Degree=2

Owing to the use of only one relational database, it is possible readily to effect joining operations in the same SQL query in order to retrieve values originating from other tables or to pose questions relating to external criteria. It is thus possible to reply to the following questions:

what is the list (with address) of the sales made in Europe (Id=1)?
SELECT Entities.Address, Sales.Identifier, Sales.Amount FROM Nodes, Sales, Entities WHERE Sales.Identifier=Nodes.Identifier AND Nodes. Relation=1 AND Nodes.Degree=2 AND Entities.Identifier=Nodes.Identifier
what is the list (with address) of the sales made in the cities of Europe (Id=1) of more than 3 million inhabitants?
SELECT Entities.Address, Sales.Identifier, Sales.Amount FROM Nodes, Sales, Entities WHERE Sales.Identifier=Nodes.Identifier AND Nodes.Relation=1 AND Nodes.Degree=2 AND Entities.Identifier=Nodes.Identifier AND Entities.Inhabitants>=3 000 000

It should be noted that, in order to permit other queries, it is advantageous to provide in the table of Nodes a "depth" column which, unlike the Degree column, permits searches pertaining to the depth of an element relative to the top of the hierarchy. That column enables SQL queries to be simplified but it is not absolutely necessary because it is possible to obtain similar results by additional joining.

The following further advantages are obtained:
the approach can be used for any SQL database because it does not use a particular specificity;
the query is executed in a single pass, and the developer does not have to merge the results of multiple queries;
this data model permits the management of any number of levels in a hierarchy with branches of different depths; and an optimisation of the accesses to the database can be obtained in a simple manner owing to the addition of indexes on one or more fields of the table 14C.

The invention claimed is:

1. A computer configured to manage a relational database that does not resort to tools for the multidimensional interrogation of the relational database that would be external to the relational database comprising:

a relational database that includes database filter means, stored in a server, for filtering data contained in fields of tables stored in the relational database, using internal algorithms to optimize the relational database and for providing the data sought in response to a query formulated in SQL language and applied directly on the relational database, said query formulated in SQL language defining a database filter, and a plurality of hierarchized datum belonging to a data hierarchy having at least three hierarchical levels; and interrogation means, stored in the computer, for formulating at least one query formulated in SQL language defining a database filter permitting the selection of the data sought by using the database filter means, wherein said computer further comprises a hierarchy table stored in the relational database and comprising a respective row for each possible pair of the plurality of hierarchized datum, wherein each possible pair comprises a first hierarchized datum and a second hierarchized datum, the second hierarchized datum being one hierarchized datum on which the first hierarchized datum is directly or indirectly dependent, each respective row for each possible pair with the direct or indirect dependency comprising:

the first hierarchized datum;

the second datum; and an indicator of the degree of relationship arising from the direct or indirect dependency, the relationship representing the distance between a hierarchical level of the first hierarchised datum and a hierarchical level of the second hierarchised datum and/or an indicator of a level of hierarchical depth representing the distance between the hierarchical level of the first hierarchised datum and the highest level of the hierarchised data on which the first hierarchised datum is dependent, and wherein, during an interrogation on the basis of a query formulated in SQL language pertaining to hierarchised data, the database filter means provides a response to said query formulated in SQL language, on the basis of the tables contained in the relational database and on the basis of the hierarchy table only, without resorting to tools for the multidimensional interrogation of a relational database that would be external to the relational database.

2. Computer according to claim 1, wherein the database filter means comprises stored procedures and/or parameterised queries.

3. Computer according to claim 1, wherein the relational database comprises at least one table containing relationships among the fields of the various tables.

4. Computer according to claim 3, wherein the database filter means comprises an indexer in order to index the hierarchy table.

5. Computer according to claim 1, wherein the hierarchy table comprises, for each hierarchised datum, a row, of which the indicator of the degree of relationship is zero and in which the first hierarchised datum and the second hierarchised datum are identical.

6. Computer according to claim 1, further comprising at least one table which describes at least some of the hierarchised data.

7. Computer according to claim 1, wherein the interrogation means further comprises generating means for generating the hierarchy table using the hierarchised data.

* * * * *